(No Model.)

A. H. CRIDGE.
IMPLEMENT FOR SEPARATING CHECKS, TICKETS, &c.

No. 406,199. Patented July 2, 1889.

WITNESSES:

INVENTOR:
A. H. Cridge
BY Munn & Co.
ATTORNEYS.

UNITED STATES PATENT OFFICE.

ALFRED H. CRIDGE, OF NEW YORK, N. Y.

IMPLEMENT FOR SEPARATING CHECKS, TICKETS, &c.

SPECIFICATION forming part of Letters Patent No. 406,199, dated July 2, 1889.

Application filed October 30, 1888. Serial No. 289,499. (No model.)

*To all whom it may concern:*

Be it known that I, ALFRED H. CRIDGE, of the city, county, and State of New York, have invented a new and Improved Implement for Separating Checks, Tickets, Stock - Certificates, &c., from their Stubs, of which the following is a full, clear, and exact description.

It frequently happens that the validity of checks, tickets, certificates, and other papers that are torn from stubs is called into question, and at times it is extremely difficult to distinguish between the genuine and forged papers of this kind.

It is to facilitate the detection of forgeries that I have designed the implement forming the subject-matter of this application, the implement consisting, essentially, of a detacher or tearer having an irregularly-serrated edge, and it will be found in practice that the line of tear produced by the use of the implement will vary with each particular use, consequently that the ticket or other paper separated from the stub can be fitted only to its own particular stub.

Reference is to be had to the accompanying drawings, forming a part of this specification, in which similar figures and letters of reference indicate corresponding parts in all the views.

Figure 1:
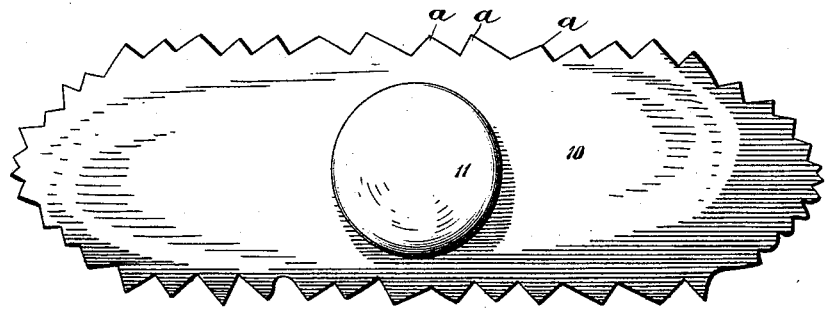
Figure 2:
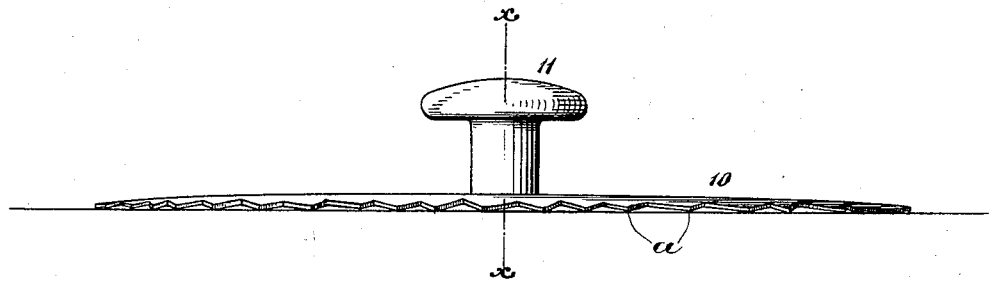
Figure 3:
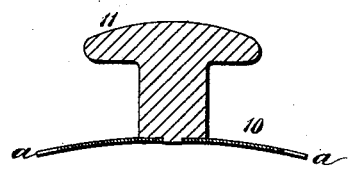

Figure 1 is a plan view of my improved detacher. Fig. 2 is a side view of the same, and Fig. 3 is a cross-sectional view taken on line *x x* of Fig. 2.

In constructing the implement forming the subject-matter of this application I provide a plate 10, preferably a metal plate, and upon the edge of the plate I form teeth *a a*, said teeth varying in size and being of irregular contour, thus producing an irregularly-serrated edge. The plate 10 is concavo-convex, the concave side being the under side of the plate. To the upper side of the plate I secure a knob or handle 11.

In use the implement is applied so that one of its edges will rest upon the space dividing the check or other paper from its stub, and then the paper is torn from the stub in the usual way, the line of tear corresponding approximately with that of the edge against which the check is torn. As the slightest variation in the position of the tearing-implement would vary the form of the tear, it is almost impossible to fit a paper not torn from a particular stub against said stub.

As the under side of the plate 10 is concave, the edge of the plate will lie close to the surface of the paper when the plate is placed in the tearing position.

Having thus described my invention, I claim as new and desire to secure by Letters Patent—

1. A detacher or tearing implement having an irregularly-serrated edge.

2. A detacher or tearing implement having a surrounding serrated edge, the teeth or projections forming said edge varying in form.

3. A detacher or tearing implement having a concave under surface and a serrated edge.

4. A detacher or tearing implement having a concave under surface and an irregularly-serrated edge.

ALFRED H. CRIDGE.

Witnesses:
JOHN C. R. ECKERSON,
W. A. CASHEN.